Patented Aug. 25, 1931

1,820,019

UNITED STATES PATENT OFFICE

RUDOLF HEIDENREICH, OF LEVERKUSEN-ON-THE-RHINE, AND WERNER ZERWECK AND ERNST HONOLD, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

COMPOUNDS OF THE ANTHANTHRONE SERIES

No Drawing. Application filed January 31, 1929, Serial No. 336,635, and in Germany February 3, 1928.

The present invention relates to new dyestuffs and intermediate products of the anthanthrone series and to a process of preparing same.

In accordance with the invention the action of agents yielding sulfur, especially alkali metal xanthogenates, trithiocarbonates and the like, on halogenated anthanthrones leads to the formation of new substances, some of which are themselves valuable vat dyestuffs, while others can serve as intermediate products for the manufacture of other dyestuffs.

The reaction may advantageously be performed by dissolving or suspending the halogenated anthanthrone in a suitable, high boiling organic solvent, such as nitrobenzene, ortho-dichlorobenzene, trichlorobenzene and the like, adding the substance yielding sulfur, advantageously in excess of the theoretical amount, and heating this mixture to about 120–150° C. while stirring. After some hours the reaction products which probably correspond to the general formula

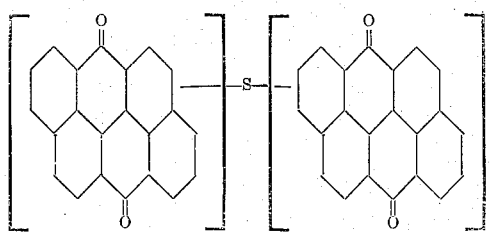

wherein the anthanthrone nuclei may be substituted, separate. They can be filtered off with suction, washed first with small quantities of the solvent used during the reaction and then with alcohol and dried.

The products thus obtained are strongly colored compounds difficultly soluble in the usual organic solvents, yielding a vat with an alkaline hydrosulfite solution, from which vat cotton is dyed in many cases clear and strong shades. Our new products may also be used as starting materials for the production of other vat dyestuffs.

The following example illustrates our invention without limiting it thereto:—

Example.—4,6 parts by weight of 2.7-dibromoanthanthrone are dissolved in 250 ccs. of boiling nitrobenzene, the solution is cooled to about 120° C. and 10 parts by weight of potassium xanthogenate are then added. The temperature of the reaction mixture is kept at about 130–145° C., whereupon after a few minutes browning occurs. After stirring for 1–1½ hours the coloration of the reaction mixture changes to violet blue. The separation of the dyestuff is complete after a few hours. The small violet gray needles are filtered, washed with nitrobenzene and then with alcohol, boiled with water and dried. The new dyestuff dyes cotton from a reddish-violet hydrosulfite vat clear reddish-violet shades of satisfactory fastness to boiling and bucking.

As the result of the reaction described in the example there is produced the 2.2′-dibromo-7.7′-dianthanthronyl-thioether of the probable formula

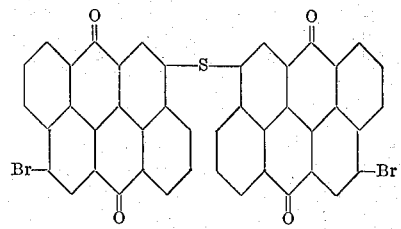

When starting with other halogenated anthanthrones instead of 2.7-dibromoanthanthrone, such as 2-monobromoanthanthrone, 2.7-dichloroanthanthrone, tri- or tetra- bromoanthanthrone and the like, products of a similar constitution will be obtained.

The same dyestuffs of the anthanthrone series are formed when using halogenated benzo-benzanthrone-carboxylic acids (cf. British Patent No. 288.666) as starting materials by treating them with an agent yielding sulfur and effecting subsequently the ring closure to the anthanthrone derivative.

We claim:—

1. Process which comprises, reacting upon a halogenated anthanthrone with a compound of the group consisting of alkali metal xanthogenates and trithiocarbonates in the presence of a suitable high boiling organic solvent.

2. Process which comprises, reacting upon a halogenated anthanthrone with an alkali metal xanthogenate, in the presence of a high boiling organic solvent at a temperature of about 120–150° C.

3. Process which comprises, reacting upon a halogenated anthanthrone with potassium xanthogenate, in the presence of nitrobenzene at a temperature of about 120–150° C.

4. Process which comprises, reacting upon 4.6 parts by weight of 2.7-dibromoanthanthrone, dissolved in 250 ccs. of nitrobenzene with 10 parts by weight of potassium xanthogenate at a temperature of about 130–145° C.

5. The products of the probable general formula

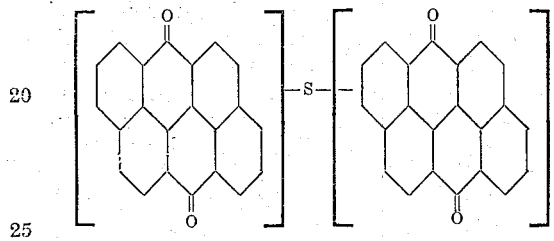

wherein the anthanthrone nuclei may be substituted, said products being strongly colored compounds, difficultly soluble in the usual organic solvents, yielding a vat with alkaline hydrosulfite solution.

6. The product of the probable formula

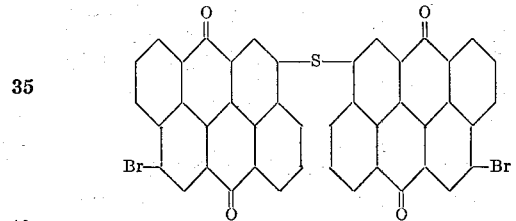

said product forming violet gray needles, dyeing cotton from a reddish-violet hydrosulfite vat clear reddish-violet shades.

In testimony whereof we have hereunto set our hands.

RUDOLF HEIDENREICH. [L. S.]
WERNER ZERWECK. [L. S.]
ERNST HONOLD. [L. S.]